US011536286B2

(12) United States Patent
Shah et al.

(10) Patent No.: US 11,536,286 B2
(45) Date of Patent: Dec. 27, 2022

(54) SYSTEMS AND METHODS FOR IMPROVING AIRFLOW IN A CENTRIFUGAL BLOWER

(71) Applicant: Microsoft Technology Licensing, LLC, Redmond, WA (US)

(72) Inventors: Ketan R. Shah, Redmond, WA (US); Sudeendra Durgappa, Bellevue, WA (US); Keith Walter Kaatz, Sammamish, WA (US); Kashyap Adury, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 54 days.

(21) Appl. No.: 16/943,583

(22) Filed: Jul. 30, 2020

(65) Prior Publication Data

US 2022/0034330 A1 Feb. 3, 2022

(51) Int. Cl.
*F04D 29/28* (2006.01)
*F04D 17/08* (2006.01)

(52) U.S. Cl.
CPC .......... *F04D 29/281* (2013.01); *F04D 17/08* (2013.01)

(58) Field of Classification Search
CPC .......... F04D 29/281–282; F04D 29/30; F04D 29/4226; F04D 17/08
See application file for complete search history.

(56) References Cited

U.S. PATENT DOCUMENTS

| 5,934,877 | A | * | 8/1999 | Harman | F01D 5/048 |
| | | | | | 415/206 |
| 7,201,565 | B2 | | 4/2007 | Ku et al. | |
| 7,488,151 | B2 | * | 2/2009 | Harman | F04D 29/4226 |
| | | | | | 415/206 |
| 9,069,535 | B2 | | 6/2015 | Degner et al. | |
| 9,546,667 | B2 | * | 1/2017 | Chen | F04D 29/281 |
| 10,001,128 | B2 | * | 6/2018 | Lin | F04D 29/023 |
| 10,018,201 | B2 | | 7/2018 | Jia et al. | |
| 10,066,637 | B2 | * | 9/2018 | Nakano | F04D 29/30 |
| 10,718,342 | B2 | * | 7/2020 | Chang | F04D 29/4226 |
| 2001/0036405 | A1 | | 11/2001 | Yokoyama et al. | |
| 2013/0224004 | A1 | | 8/2013 | Radhakrishnan et al. | |
| 2014/0133988 | A1 | | 5/2014 | Son et al. | |
| 2016/0053771 | A1 | * | 2/2016 | Jia | F04D 29/023 |
| | | | | | 416/219 A |

(Continued)

FOREIGN PATENT DOCUMENTS

JP 3096854 U * 1/2014 ............. F04D 29/30
WO 2017113811 A1 7/2017

OTHER PUBLICATIONS

English Translation of Foreign Reference JP3096854U, "https://patents.google.com/patent/JP3096854U/en?oq=JP+3096854" (Year: 2003).*

(Continued)

*Primary Examiner* — Igor Kershteyn
(74) *Attorney, Agent, or Firm* — Ray Quinney & Nebeker P.C.; Paul N. Taylor

(57) ABSTRACT

An impeller for a centrifugal blower includes at least one blade oriented in a radial direction of the impeller. The blade has an airfoil section with a radially inward end and a radially outward end that are thinner than at least one point between the radially inward end and the radially outward end.

20 Claims, 8 Drawing Sheets

(56) References Cited

U.S. PATENT DOCUMENTS

| | | | | |
|---|---|---|---|---|
| 2017/0184129 | A1* | 6/2017 | He | F04D 29/281 |
| 2018/0252237 | A1* | 9/2018 | Lin | F04D 25/0613 |
| 2019/0230814 | A1* | 7/2019 | Hatanaka | F04D 29/4226 |
| 2020/0088209 | A1* | 3/2020 | Chen | F04D 29/281 |
| 2020/0370563 | A1* | 11/2020 | Chen | F04D 29/002 |
| 2021/0047931 | A1* | 2/2021 | Horng | F04D 29/34 |
| 2021/0190089 | A1* | 6/2021 | Horng | F04D 29/668 |
| 2021/0215170 | A1* | 7/2021 | Chen | F24F 7/007 |
| 2021/0270281 | A1* | 9/2021 | Kuang | F04D 29/281 |
| 2022/0034330 | A1* | 2/2022 | Shah | F04D 29/281 |

OTHER PUBLICATIONS

Torshizi, et al., "Multilevel optimization of the splitter blade profile in the impeller of a centrifugal compressor", In Scientia Iranica, vol. 24, Issue 2, Apr. 2017, pp. 707-714.

"International Search Report and Written Opinion Issued in PCT Application No. PCT/US21/030757", dated Jul. 12, 2021, 9 Pages.

* cited by examiner

SYSTEMS AND METHODS FOR IMPROVING AIRFLOW IN A CENTRIFUGAL BLOWER

BACKGROUND

Background and Relevant Art

Electronic devices generate heat. The heat can be dissipated into the air surrounding the electronic device by forcing air through or over surfaces of the electronic device. A centrifugal blower can draw air in through an axial intake and radially outward to force air through a relatively thin conduit, which is convenient for electronic device housing and packaging.

BRIEF SUMMARY

In some embodiments, an impeller for a centrifugal blower includes at least one blade oriented in a radial direction of the impeller. The blade has an airfoil section with a radially inward end and a radially outward end that are thinner than at least one point between the radially inward end and the radially outward end.

In some embodiments, an impeller for a centrifugal blower includes a hub and at least one blade connected to the hub and oriented in a radial direction of the impeller. The blade has an airfoil section with a radially inward end and a radially outward end that are thinner than at least one point between the radially inward end and the radially outward end. The airfoil section has a negative rake relative to a direction of rotation of the impeller. The blade also has an exit section with a more positive rake than the airfoil section.

In some embodiments, a centrifugal blower for use in an electronic device includes an impeller and a housing. The impeller is configured to rotate around a rotational axis in a rotational direction. The housing includes at least one volute. The volute includes an outer wall positioned at a volute radius that increases in the rotational direction of the impeller.

This Summary is provided to introduce a selection of concepts in a simplified form that are further described below in the Detailed Description. This Summary is not intended to identify key features or essential features of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
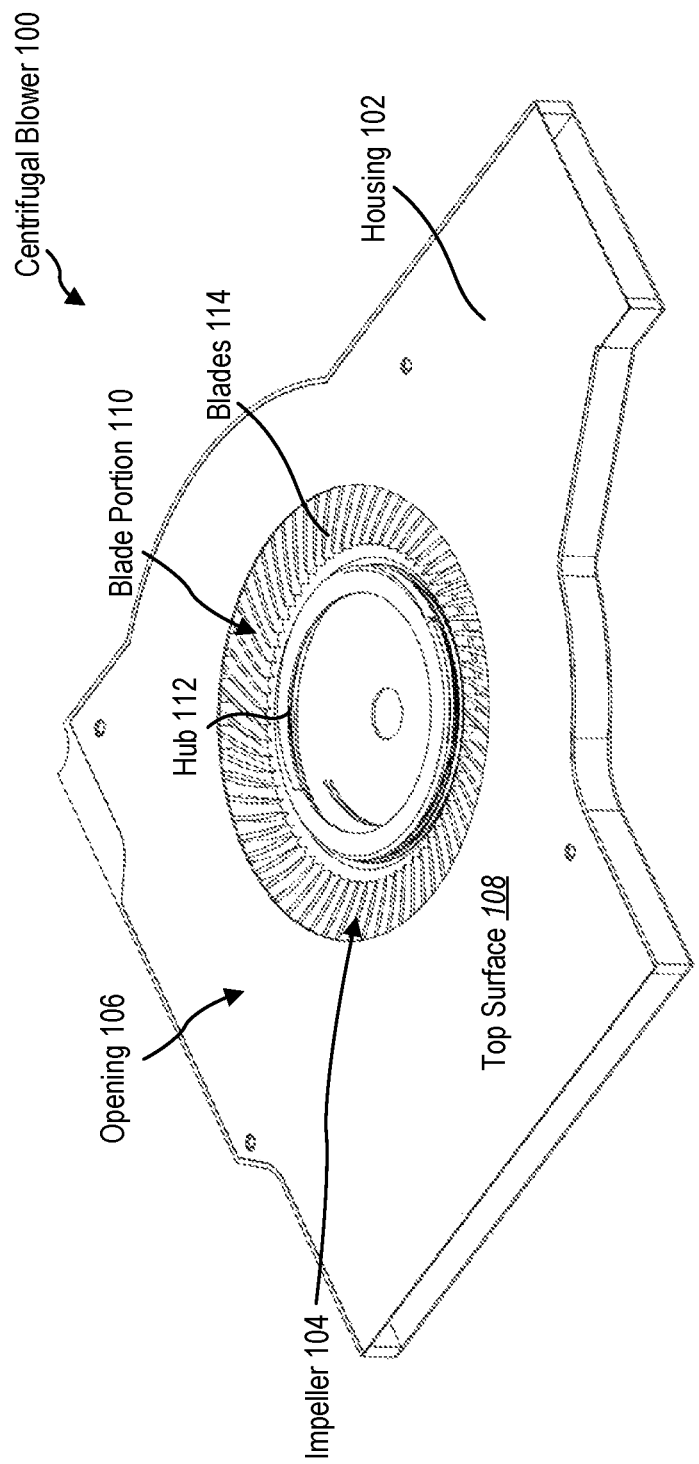
FIG. 1 is a perspective view of a centrifugal blower, according to at least some embodiments of the present disclosure.

The present disclosure relates generally to systems and methods for improving thermal management in an electronic device. In particular, the present disclosure relates to improving airflow in and acoustic performance of a centrifugal blower in an electronic device. An electronic device may include and electronic device, computing or otherwise, that requires thermal management via air cooling. Examples of electronic device that may include a centrifugal blower according to the present disclosure include a laptop computing device, tablet computing device, hybrid (also known as a 2-in-1) computing device, personal computing device (such as a smartphone), wearable electronic device (such as a head-mounted device or smartwatch), desktop computing device, display monitor, television, media playback device, household appliances (such as a microwave or a refrigerator), or any other device that generates heat during use. In particular, thin and light portable computing devices may require small, thin, and efficient thermal management devices such as embodiments of centrifugal blowers described herein.

A centrifugal blower draws inlet air through an intake in an axial direction proximate a central hub and forces outlet air out in a radial direction away from the hub. An impeller rotates around the rotational axis to accelerate the air radially outward. The centrifugal blower has a housing with at least one volute to direct the outlet air to devices or locations that require airflow for cooling or other reasons. In some embodiments, the volute(s) increases in cross-sectional area in the flow direction, decreasing air pressure and slowing the outlet air as the outlet air flows away from the hub. In some embodiments, the volute(s) decreases in cross-sectional area in the flow direction, pressurizing and/or accelerating the outlet air.

In some embodiments, performance of the centrifugal blower can be improved by increased airflow efficiency through the impeller in the centrifugal blower, reducing rotational resistance of the impeller in the centrifugal blower, increasing airflow efficiency through the volute(s) of the centrifugal blower, or combinations thereof. While increasing rotational speed of the impeller can increase total airflow, improving efficiency of the centrifugal blower can allow increased airflow at the same rotational speeds and/or acoustic levels. For example, improving acoustic performance allows for higher rotational speeds (and therefore increased airflow) with the same audible effect for a user. In some examples, improving the efficiency can allow an electronic device to operate the centrifugal blower at a lower rotational speed, providing lower acoustic levels and reducing electrical power consumption.

An impeller according to the present disclosure includes an airfoil section of a blade that generates positive pressure on one side of the blade in the rotational direction and negative pressure on an opposite side of the blade in the rotational direction. The pressure differential creates a net force relative to the blade, improving the centrifugal blower efficiency and hence improved airflow at the same rotational speed and acoustics. In some embodiments, a blade includes a forward-raked radially outward tip that improves airflow efficiency at the radially outward tip to accelerate the outlet air. In some embodiments, a blade includes boundary layer features at the radially outward tip of the blade and/or the radially inward tip where the blade is proximate the hub. The boundary layer features, such as serrations, dimples, fins, recesses, or protrusions, can disrupt a boundary layer of air proximate the tip(s) of the blade and create microvortices or other turbulence at the surface to improve the acoustic properties and stability of the blade.

FIG. 1 is a perspective view of a centrifugal blower 100 according to some embodiments of the present disclosure. In some embodiments, a centrifugal blower 100 includes a housing 102 and an impeller 104 positioned and/or supported by the housing 102. The housing includes an opening 106 in a top surface 108 to allow the impeller 104 to intake inlet air from the axial direction. In some embodiments, the opening 106 has an area that is greater than half the area of the blade portion 110 of the impeller 104. The blade portion 110 is the annular portion of the impeller 104 around the hub 112 where the blades 114 are located. In some embodiments, the opening 106 has an area that is less than half the area of the blade portion 110 of the impeller 104. In some embodiments, the hub 112 includes inlets that allow air to flow in between the blades 114 from a radially inward end of the blade portion 110.

Figure 2:
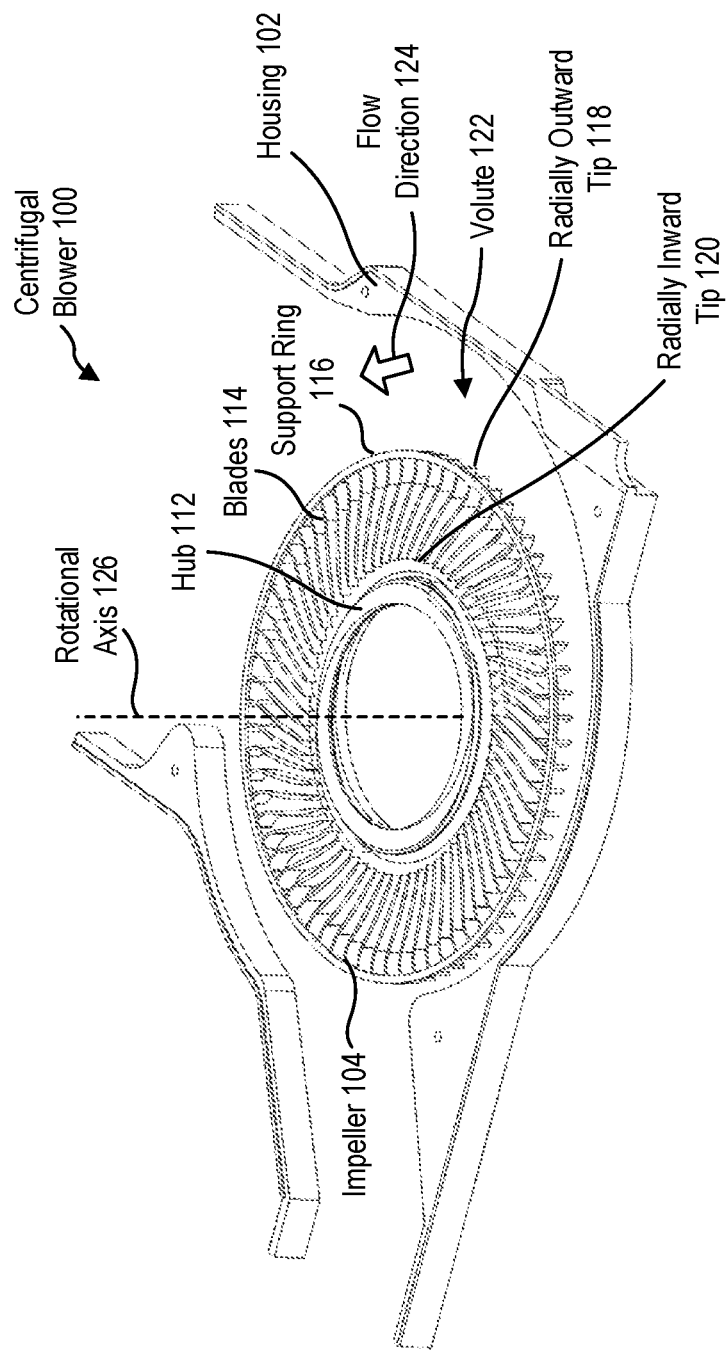
FIG. 2 is a perspective view of the centrifugal blower of FIG. 1 with the top surface removed.

FIG. 2 is a perspective view of the centrifugal blower 100 of FIG. 1 with the top surface of the housing 102 removed. The centrifugal blower 100 has an impeller 104 with a plurality of blades 114 supported between a hub 112 and a support ring 116. In some embodiments, the support ring 116 is positioned proximate to and connected to an radially outward tip 118 of the plurality of blades 114. In some embodiments, the support ring 116 is located at a radial location along the radial length of the blades 114 that is between the radially inward tip 120 of the blade 114 and the radially outward tip 118 of the blade.

The impeller 104 is positioned in the housing 102 of the centrifugal blower 100. At least one volute 122 of the housing 102 is located radially outward from the impeller 104. In some embodiments, the volute 122 has a cross-sectional area that increases in the flow direction 124, decreasing air pressure and slowing the outlet air as the outlet air flows away from the impeller 104. In some embodiments, the volute(s) 122 decreases in cross-sectional area in the flow direction, pressurizing and/or accelerating the outlet air.

The impeller 104 includes a hub 112 and a plurality of blades 114 radially outward from the hub. In some embodiments, each blade 114 of the plurality of blades is identical to all of the other blades of the plurality of blades. In some embodiments, at least one blade 114 is different from another blade. For example, the plurality of blades may have two different blade geometries that alternate with each adjacent blade 114 in the rotational direction. In some embodiments, the plurality of blades is rotationally balanced. For example, the plurality of blades may be symmetrical through a point of inversion at the rotational axis 126, such that mass at any location on the impeller is balanced across the rotational axis 126.

Figure 3:
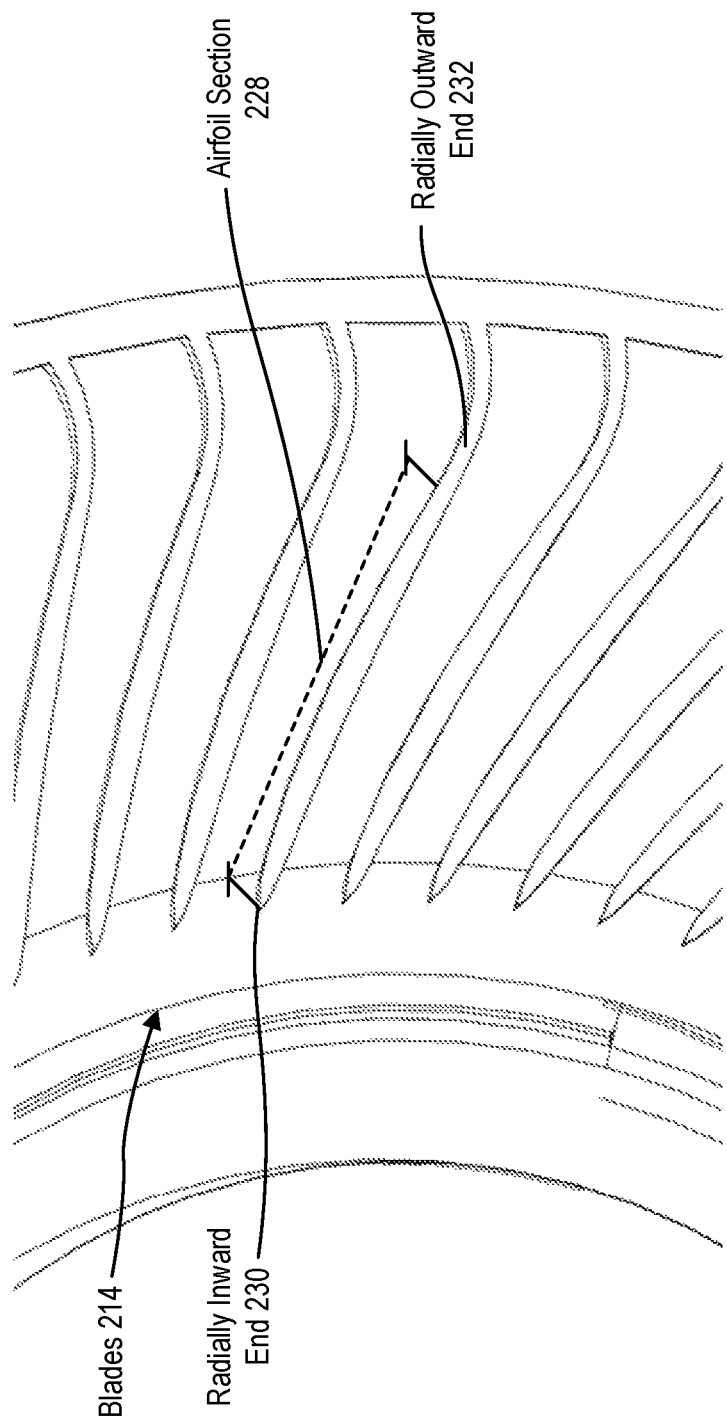
FIG. 3 is a detail top view of an impeller, according to at least some embodiments of the present disclosure.

FIG. 3 is a top detail view of an embodiment of a plurality of blades 214 according to the present disclosure. In some embodiments, a blade 214 according to the present disclosure has an airfoil section 228. The airfoil section 228 has a radially inward end 230 and a radially outward end 232. The airfoil section 228 is narrowest at the radially inward end 230 and at the radially outward end 232 with a thicker section therebetween. In a variety of embodiments, the airfoil section 228 may have a variety of geometries. In some embodiments, the airfoil section 228 has a geometry that is described by the National Advisory Committee for Aeronautics (NACA) standards. In at least one example, the airfoil section 228 has a NACA 4405 geometry.

The first digit of the NACA standard describes the maximum camber in percentage of the two-dimensional airfoil chord (e.g., the radial length of the airfoil section). The second digit of the NACA standard describes the approximate location of the maximum camber point along the chord line in $10^{th}$s of the chord line. The third and fourth digits, collectively, of the NACA standard describe the maximum thickness of the airfoil. Therefore, a 4405 geometry airfoil section has a maximum camber of 4% of the radial length of the airfoil section, and the maximum camber is located at 40% of the radial length of the airfoil section. The airfoil section has a maximum thickness in the direction of rotation that is 05% of the radial length of the airfoil section. In some embodiments, the airfoil has a geometry as thin as 4402 or as thick as 8610. Other examples of suitable airfoil geometries include 2204, 4412, and 6610. In some embodiments, the first digit of the NACA geometry is between 2 and 6. In some embodiments, the second digit of the NACA geometry is between 2 and 5. In some embodiments, the third and fourth digits, collectively, are between 04 and 12.

Figure 4:
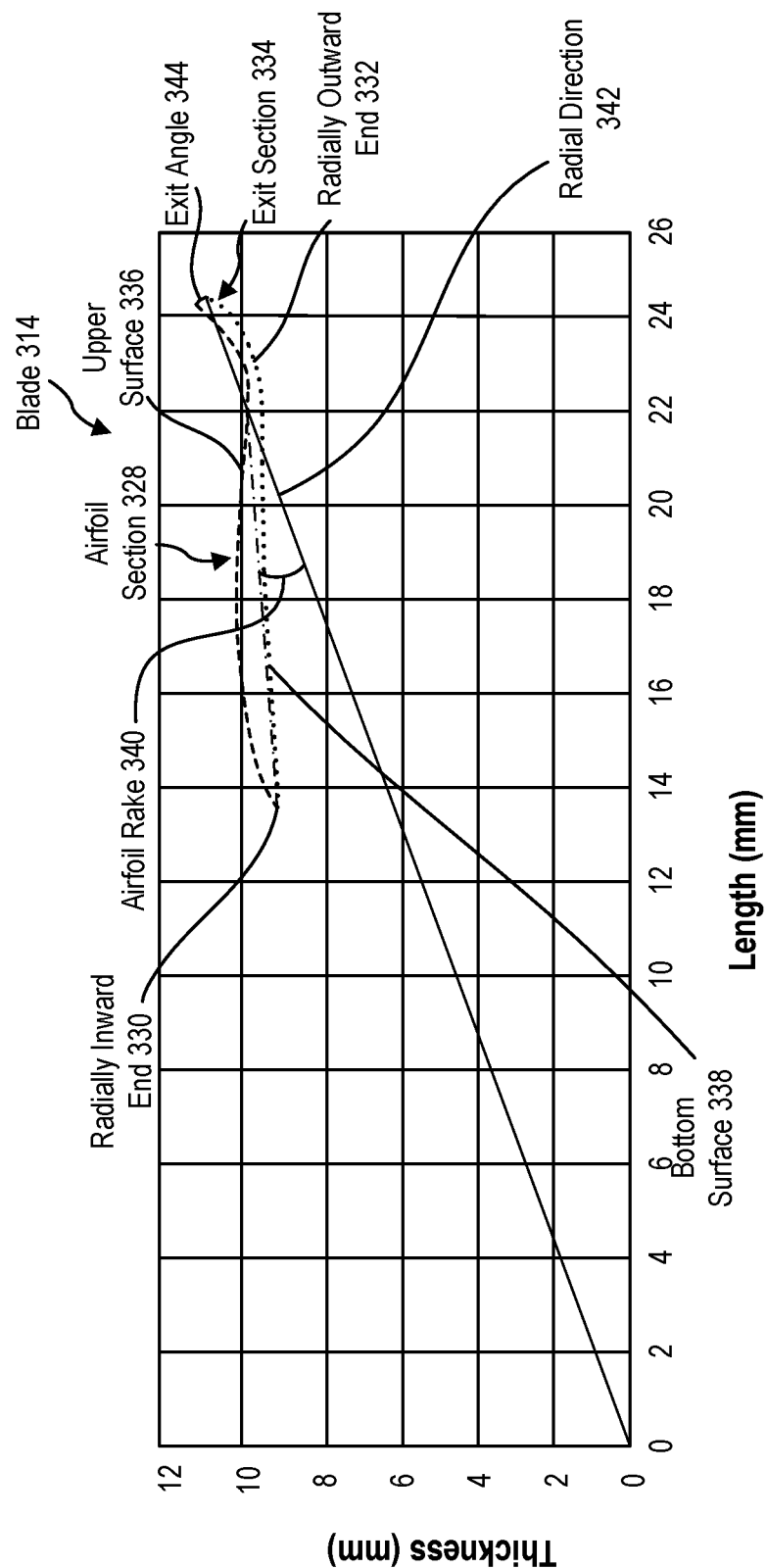
FIG. 4 is a simulation of a blade, according to at least some embodiments of the present disclosure.

FIG. 4 is a simulated geometry of an embodiment of a blade 314 according to the present disclosure. The blade 314 has an airfoil section 328 and an exit section 334. A favorable pressure gradient is desirable along the upper surface 336 of the airfoil section 328 to about 40-45% chord. The radially inward end 330 is a region having a shallow, adverse pressure gradient (transition ramp) that promotes efficient transition from laminar to turbulent flow. The curved transition ramp over the upper surface 336 of the airfoil section 328 (relative to the direction of airflow radially outward) is followed by a nearly linear pressure moment and stall characteristics. A steep, adverse pressure gradient at about 90-percent chord is a 'separation ramp', which confines turbulent separation to a small region near the trailing edge at the radially outward end 332. In some embodiments, by replacing the trailing edge with a forward raked exit section 334, the static pressure is recovered and embodiments of blades 314 according to the present disclosure are able to achieve high flow rates, high static pressure, and higher acoustic performance.

In some embodiments, the airfoil section 328 is the entire length of the blade 314. In some embodiments, the airfoil section 328 is a percentage of the length of the blade in a range having an upper value, a lower value, or upper and lower values including any of 50%, 60%, 70%, 80%, 90%, 100%, or any values therebetween. In some embodiments, the airfoil section 328 may be greater than 50% of the length of the blade 314. In some embodiments, the airfoil section 328 may be less than 100% of the length of the blade 314. In some embodiments, the airfoil section 328 is between 50% and 100% of the length of the blade 314. In some embodiments, the airfoil section 328 is between 60% and 90% of the length of the blade 314. In at least one embodiment, the airfoil section 328 is approximately 75% of the length of the blade 314.

In some embodiments, the airfoil section 328 has a backward airfoil rake 340 relative to the rotational direction and the radial direction 342. In some embodiments, the airfoil section 328 has an airfoil rake 340 in a range having an upper value, a lower value, or upper and lower values including any of −5°, −10°, −15°, −20°, −25°, −30°, or any values therebetween. In some examples, the airfoil rake 340 is more negative than −5°. In some examples, the airfoil rake 340 is more positive than −30°. In some examples, the airfoil rake 340 is between −5° and −30°. In at least one example, the airfoil rake 340 is approximately −20°.

The airfoil section 328 may have the geometry of an airfoil in axial cross-section with the upper surface 336 and bottom surface 338 (relative to the direction of rotation) being parallel to the axial direction. In some embodiments, one or both of the upper surface 336 and bottom surface 338 is oriented with a tilt relative to the axial direction. An impeller with a tilt in at least a portion of the blade, in some embodiments, allows the centrifugal blower to operate as a hybrid axial-centrifugal blower to move the inlet and/or outlet air more axially. The tilt angle of one or both of the upper surface 336 and bottom surface 338 may be in a range having an upper value, a lower value, or upper and lower values including any of −15°, −10°, −5°, 0°, 5°, 10°, 15°, or any values therebetween. In some embodiments, the tilt angle may be greater than −15°. In some embodiments, the tilt angle is less than 15°. In some embodiments, the tilt angle is between −15° and 15°. In at least one embodiment, the tilt angle is between −5° and 5°. In at least another embodiment, the tilt angle is 0°.

The remaining exit section 334 of the blade 314 may have a constant thickness in the direction of rotation. In some embodiments, an exit section 334 of the blade 314 is positioned radially outward from the airfoil section 328. The exit section 334 may be bent or curved to alter the exit angle 344 of outlet air. The exit section may have a forward rake, no rake (radially oriented), or backward rake. In some embodiments, the exit section 334 has an exit angle 344 relative to the radial direction 342 and in the direction of rotation in a range having an upper value, a lower value, or upper and lower values including any of 0°, 5°, 10°, 15°, 20°, 25°, 30°, 35°, 40°, 45°, or any values therebetween. In some embodiments, the exit angle 344 is greater than 0°. In some embodiments, the exit angle 344 is less than 45°. In some embodiments, the exit angle 344 is between 15° and 40°. In at least one embodiment, the exit angle 344 is approximately 35°.

Figure 5:
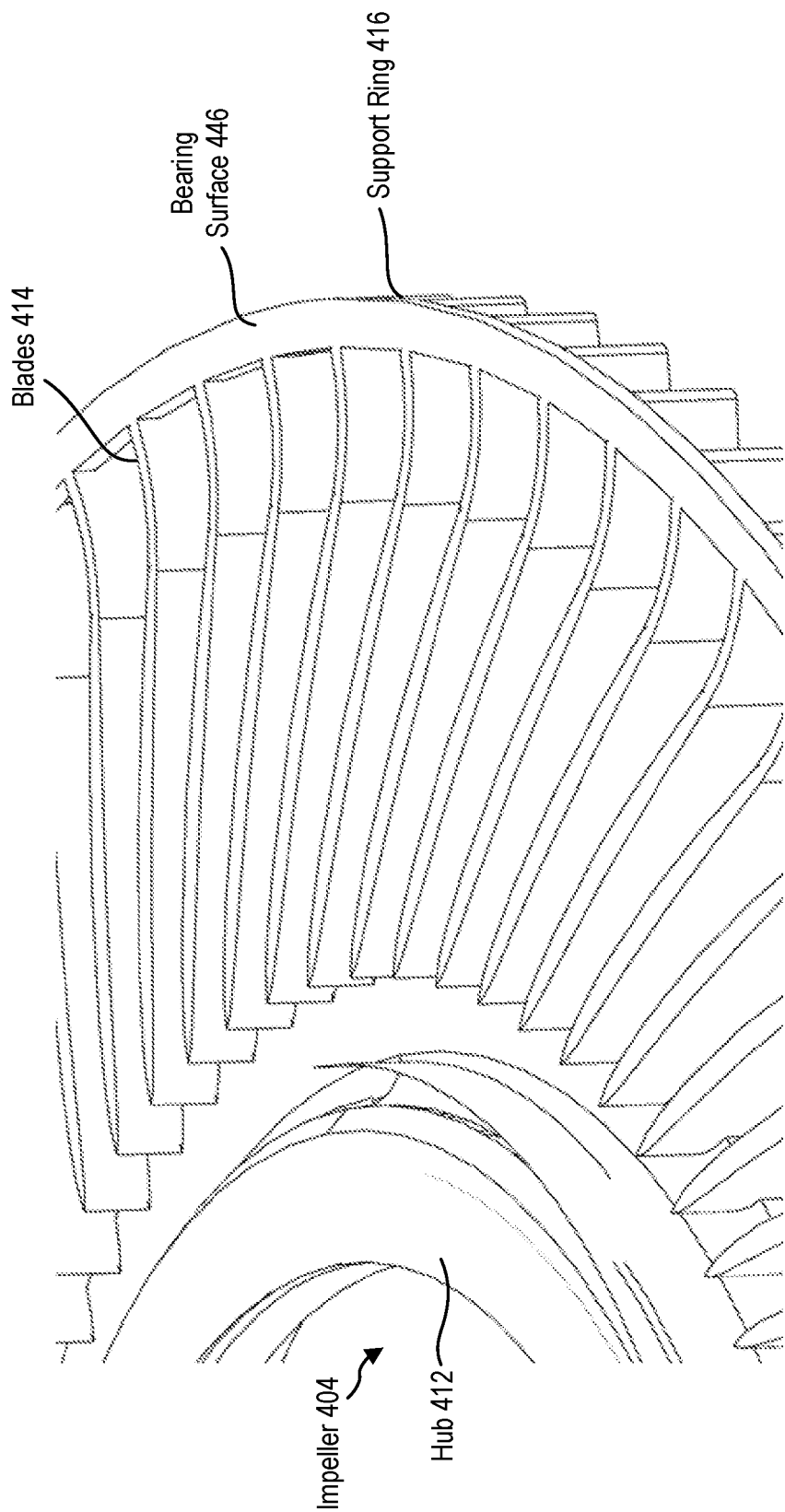
FIG. 5 is a detail perspective view of an impeller, according to at least some embodiments of the present disclosure.

FIG. 5 is a perspective detail view of an embodiment of an impeller 404 with a plurality of blades 414 supported by a hub 412 and by a support ring 416. In some embodiments, the support ring 416 is connected to a top edge of the blades 414 relative to the axial direction. In some embodiments, the support ring 416 is connected to a bottom edge of the blades 414. The support ring 416 may provide a bearing surface 446 on which the impeller 404 may rotate relative to a housing of the centrifugal blower. The support ring 416 may provide support to the blades 414 to prevent harmonic oscillations of the blades 414 during operation.

Figure 6:
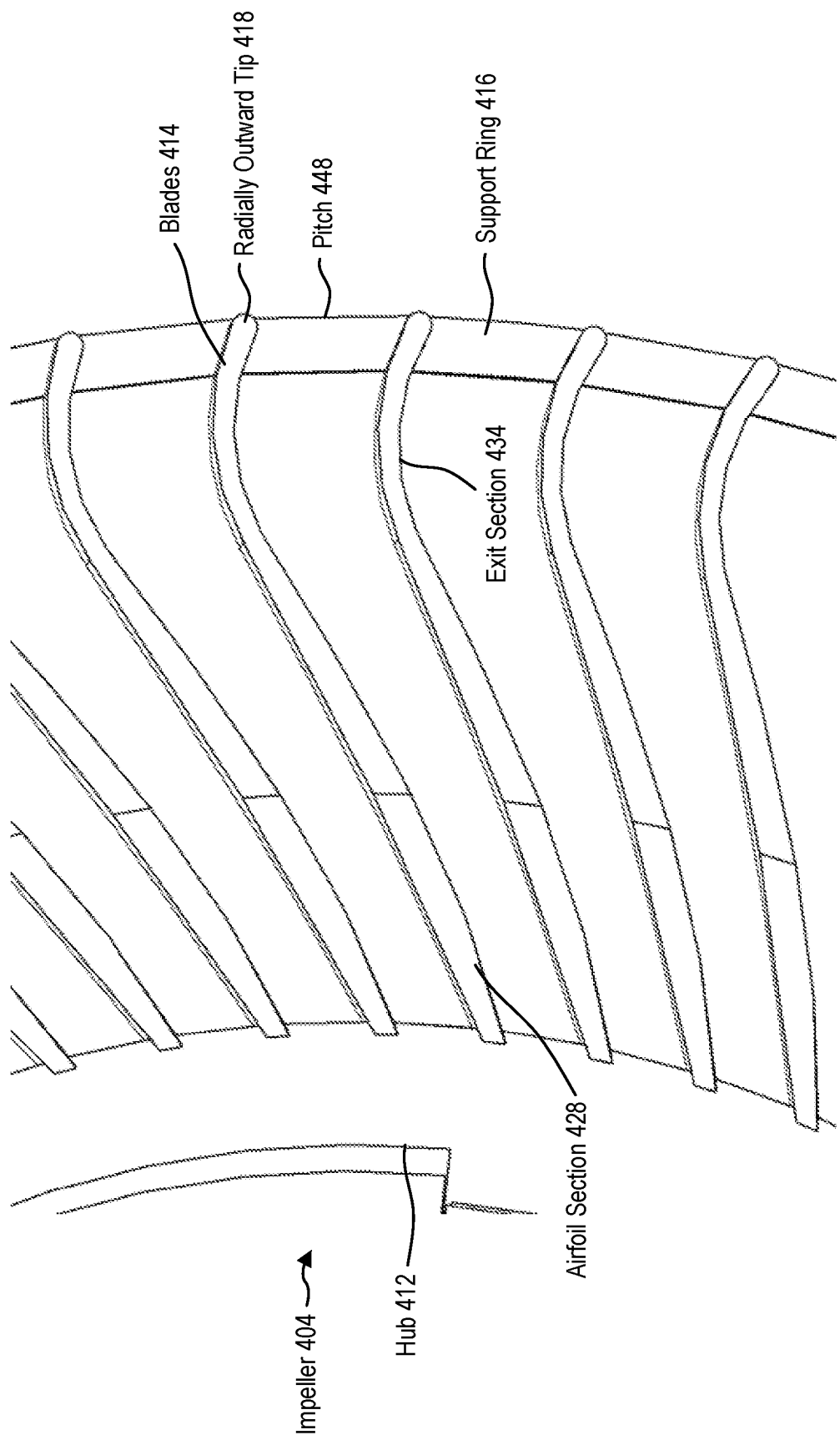
FIG. 6 is a detail bottom view of an impeller, according to at least some embodiments of the present disclosure.

FIG. 6 is a bottom view of the embodiment of an impeller 404 with a plurality of blades 414 supported by a hub 412 and by a support ring 416 of FIG. 5. The support ring 416 may also maintain a predetermined pitch 448 between the blades 414. The pitch 448 is constant between all of the blades 414, in some embodiments, while in other embodiments, the pitch 448 varies between blades 414. Varying the pitch 448 may help reduce harmonics and/or acoustics of the rotation of the blades 414, which can reduce the noise associated with operation and reduce vibrations on the impeller 404 to increase the operational lifetime of the centrifugal blower.

In some embodiments, the support ring 416 is positioned at the radially outward tip 418 of the blades 414, while in other embodiments, the support ring 416 is positioned at an intermediate point between the two ends of the blade 414. In at least one embodiment, the support ring 416 contacts and supports the blade 414 at the transition point between the airfoil section 428 and the exit section 434. The impeller 404 may include a plurality of support rings 416, such as a first support ring at the radially outward tip 418 of the blades 414 and a second support ring at an intermediate point between the two ends of the blades 414.

Figure 7:
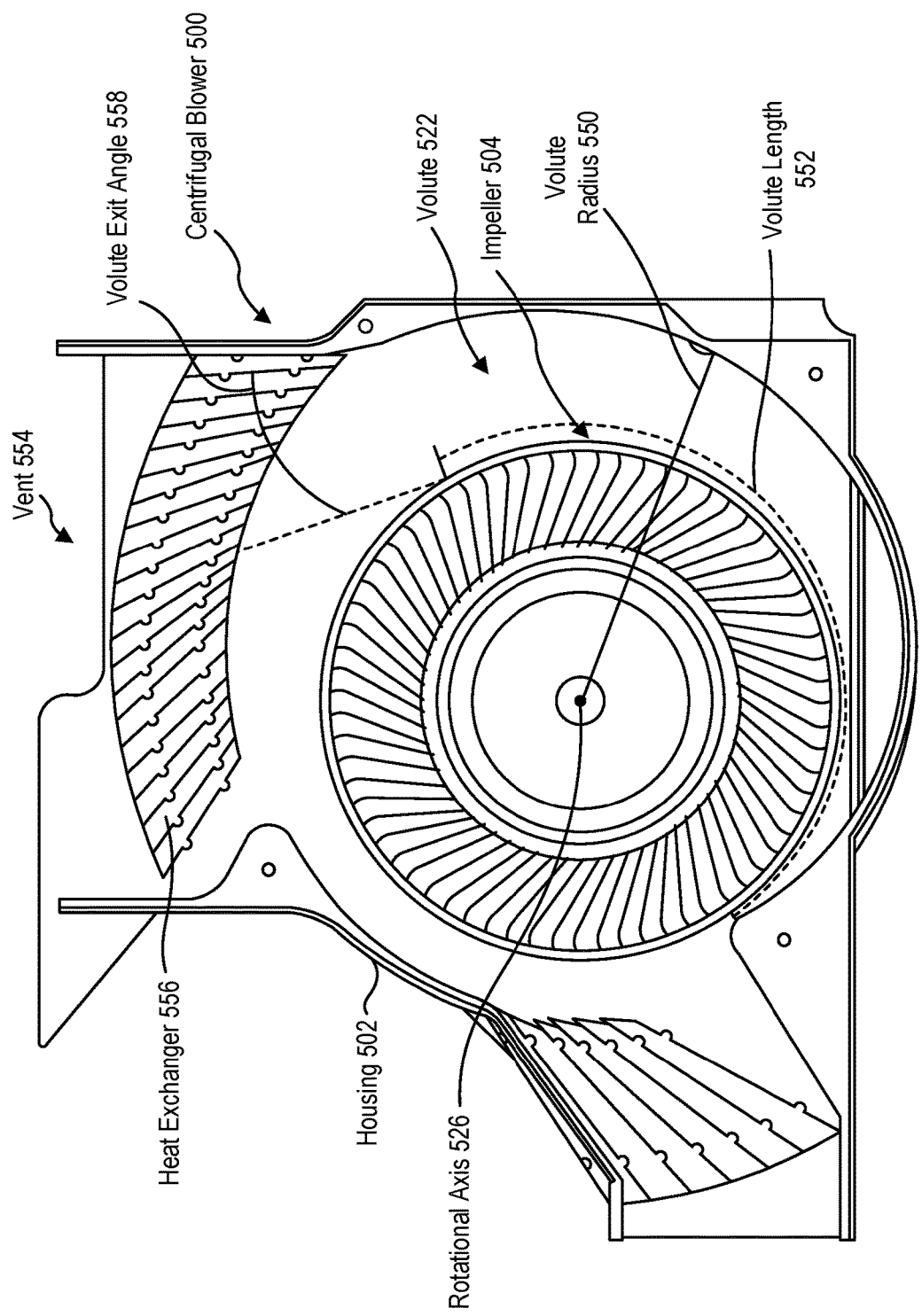
FIG. 7 is a top view of a centrifugal blower with volutes, according to at least some embodiments of the present disclosure.

The airflow into and through the impeller can be further improved by pairing an impeller according to the present disclosure with a housing including a volute having an increasing volute cross-sectional area. FIG. 7 is a top view of an embodiment of a centrifugal blower 500 with a top surface removed to show the impeller 504 and volutes 522 of the housing 502. In some embodiments, at least one volute 522 of the housing 502 includes an expanding volute radius 550 in the rotational direction of the impeller 504. The volute radius 550 relative to the rotational axis 526 of the impeller 504 increases in the direction of rotation of the impeller 504 to provide volume for the outlet air without creating additional backpressure that would impede airflow through the impeller 504. In some embodiments, the volute radius 550 has linear rate of increase in the rotational direction of the impeller 504. In some embodiments, the volute radius changes non-linearly in the rotational direction of the impeller 504. In at least one embodiment, the volute radius 550 changes non-linearly and the volute cross-sectional area changes linearly in the rotational direction of the impeller 504.

In some embodiments, the volute radius 550 is defined by $$R_v = R_i \left[ 1 + s\left(\frac{\theta}{\pi}\right) \right]$$

where the volute radius ($R_v$) is related to the impeller radius ($R_i$) and the angular position (θ) around the rotational axis 526 in radian relative to π. The linear relationship is based on a slope value (s). In some embodiments, the slope value is in a range having an upper value, a lower value, or upper and lower values including any of 0.20, 0.25, 0.30, 0.35, 0.40, 0.45, 0.50, or any values therebetween. In some embodiments, the slope value is greater than 0.20. In some embodiments, the slope value is less than 0.50. In some embodiments, the slope value is between 0.2 and 0.5. In some embodiments, the slope value is between 0.3 and 0.4. In at least one embodiment, the slope value is approximately 0.33.

The volute 522 is positioned around a portion of the circumference of the impeller 504. The volute length 552 is the linear length of the portion of the volute 522 adjacent to the impeller 504. In some embodiments, the volute length 552 around the circumference is a percentage of the circumference in a range having an upper value, a lower value, or upper and lower values including 33.3%, 35%, 40%, 45%, 50%, 55%, 60%, 65%, 66.6%, or any values therebetween. In some embodiments, the volute length 552 is greater than ⅓ of the impeller circumference. In some embodiments, the volute length 552 is less than ⅔ of the impeller circumference. In some embodiments, the volute length 552 is between ⅓ and ⅔ of the impeller circumference. In some embodiments, the volute length 552 is between 40% and 60% of the impeller circumference. In at least one embodiment, the volute length 552 is approximately 50% of the impeller circumference.

In some embodiments, the volute radius 550 increases over at least 50% of the volute length 552. In some embodiments, the volute radius 550 increases over at least 70% of the volute length 552. In some embodiments, the volute radius 550 increases over at least 90% of the volute length 552. In some embodiments, the volute radius 550 increases over at least 95% of the volute length 552.

In some embodiments, the volute radius rate of increase is linear to an exit of the volute 522 into a vent 554 or other conduit to move the outlet air away from the impeller 504. The exit may have a volute exit angle 558. In some embodiments, the volute exit angle 558 is in a range having an upper value, a lower value, or upper and lower values including any of 5°, 6°, 7°, 8°, 9°, 10°, or any values therebetween. In some embodiments, the volute exit angle 558 is greater than 5°. In some embodiments, the volute exit angle 558 is less than 10°. In some embodiments, the volute exit angle 558 is between 5° and 10°. In some embodiments, the volute exit angle 558 is between 7° and 9°. In at least one embodiment, the volute exit angle 558 is approximately 8°.

A centrifugal blower 500 according to the present disclosure can direct air for thermal management of an electronic device. The centrifugal blower 500 can exhaust hot air away from electronic components or can move cool air toward electronic components. In some embodiments, a heat exchanger 556 is positioned in a volute 522 or in the housing 502 of the centrifugal blower 500 such that outlet air is directed over and/or through the heat exchanger 556. The heat exchanger 556 may receive heat from electronic components, and the outlet air may cool the portion of the heat exchanger 556 in the centrifugal blower 500 such that a thermal gradient of the heat exchanger 556 continues to draw heat from the electronic components.

Figure 8:
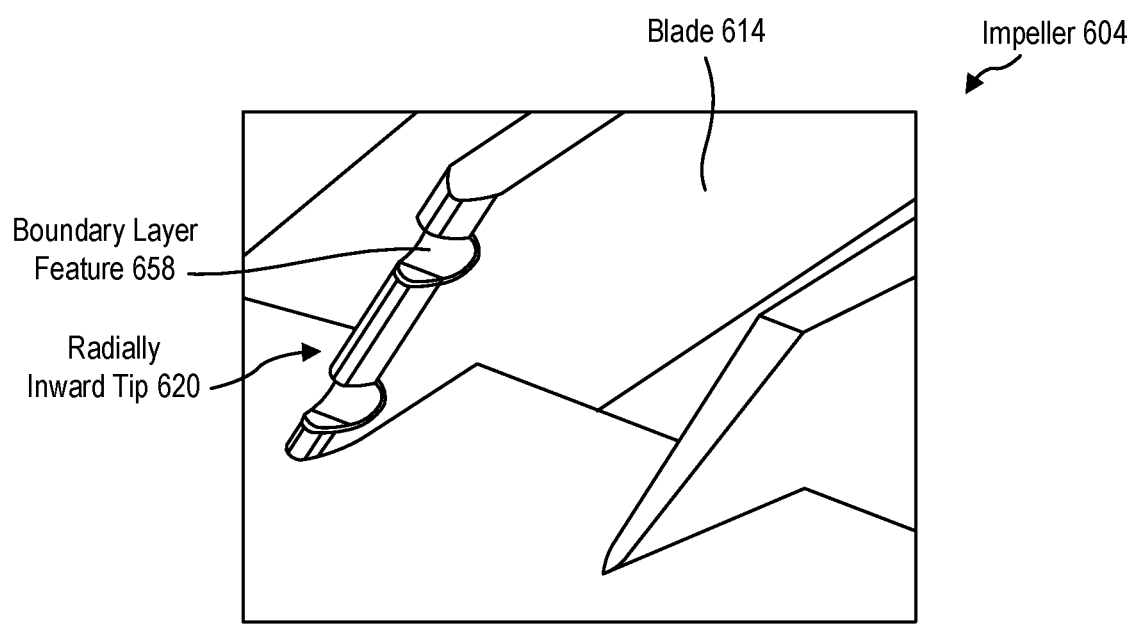
FIG. 8 is a detail view of boundary layer features, according to at least some embodiments of the present disclosure.

FIG. 8 is a detail view of a radially inward tip 620 on an embodiment of a blade 614 of an impeller 604. To facilitate operating the centrifugal blower at higher rotational speeds and/or at lower operating noise levels, in some embodiments, one or more surfaces of the impeller 604 include boundary layer features 658 to separate a boundary layer of air and improve acoustic properties of the blades 614 and impeller 604. In some embodiments, a radially inward tip 620 of the blade 614 includes serrations, dimples, recesses, or protrusions that disrupt the boundary layer and/or produce microvortices to reduce harmonic effects on the impeller 604. In some embodiments, the boundary layer features 658 are positioned on each blade 614 of the plurality of blades. In some embodiments, the boundary layer features 658 are positioned on some of the blades 614 but not all of the blades. In some embodiments, the boundary layer features 658 are positioned on the hub or support ring of the impeller 604.

INDUSTRIAL APPLICABILITY

The present disclosure relates generally to systems and methods for improving airflow through a centrifugal blower. A centrifugal blower draws inlet air through an intake in an axial direction proximate a central hub and forces outlet air out in a radial direction away from the hub. An impeller rotates around the rotational axis to accelerate the air radially outward. The centrifugal blower has a housing with at least one volute to direct the outlet air to devices or locations that require airflow for cooling or other reasons. In some embodiments, the volute(s) increases in cross-sectional area in the flow direction, decreasing air pressure and slowing the outlet air as the outlet air flows away from the hub. In some embodiments, the volute(s) decreases in cross-sectional area in the flow direction, pressurizing and/or accelerating the outlet air.

In some embodiments, performance of the centrifugal blower can be improved by increased airflow efficiency through the impeller in the centrifugal blower, reducing rotational resistance of the impeller in the centrifugal blower, increasing airflow efficiency through the volute(s) of the centrifugal blower, or combinations thereof. While increasing rotational speed of the impeller can increase total airflow, improving efficiency of the centrifugal blower can allow increased airflow at the same rotational speeds and/or acoustic levels. For example, improving acoustic performance allows for higher rotational speeds (and therefore increased airflow) with the same audible effect for a user. In some examples, improving the efficiency can allow an electronic device to operate the centrifugal blower at a lower rotational speed, providing lower acoustic levels and reducing electrical power consumption.

An impeller according to the present disclosure includes an airfoil section of a blade that generates positive pressure on one side of the blade in the rotational direction and negative pressure on an opposite side of the blade in the rotational direction. The pressure differential creates a net force relative to the blade, improving the centrifugal blower efficiency and hence improved airflow at the same rotational speed and acoustics. In some embodiments, a blade includes a forward-raked radially outward tip that improves airflow efficiency at the radially outward tip to accelerate the outlet air. In some embodiments, a blade includes boundary layer features at the radially outward tip of the blade and/or the radially inward tip where the blade is proximate the hub. The boundary layer features, such as serrations, dimples, fins, recesses, or protrusions, can disrupt a boundary layer of air proximate the tip(s) of the blade and create microvortices or other turbulence at the surface to improve the acoustic properties and stability of the blade.

In some embodiments, a centrifugal blower includes a housing and an impeller positioned and/or supported by the housing. The housing includes an opening in a surface to allow the impeller to intake inlet air from the axial direction. In some embodiments, the opening has an area that is greater than half the area of the blade portion of the impeller. The blade portion is the annular portion of the impeller around the hub where the blades are located. In some embodiments, the opening has an area that is less than half the area of the blade portion of the impeller. In some embodiments, the hub includes inlets that allow air to flow in between the blades from a radially inward end of the blade portion.

The centrifugal blower has an impeller with a plurality of blades supported between a hub and a support ring. In some embodiments, the support ring is positioned proximate to and connected to an outermost radial tip of the plurality of blades. In some embodiments, the support ring is located at a radial location along the radial length of the blades that is between the radially inward tip of the blade and the radially outward tip of the blade.

The impeller is positioned in the housing of the centrifugal blower. At least one volute of the housing is located radially outward from the impeller. In some embodiments, the volute has a cross-sectional area that increases in the flow direction, decreasing air pressure and slowing the outlet air as the outlet air flows away from the impeller. In some embodiments, the volute(s) decreases in cross-sectional area in the flow direction, pressurizing and/or accelerating the outlet air.

The impeller includes a hub and a blade portion radially outward from the hub. In some embodiments, each blade of the plurality of blades is identical to all of the other blades of the plurality of blades. In some embodiments, at least one blade is different from another blade. For example, the plurality of blades may have two different blade geometries that alternate with each adjacent blade in the rotational direction. In some embodiments, the plurality of blades is rotationally balanced. For example, the plurality of blades may be symmetrical through a point of inversion at the rotational axis, such that mass at any location on the impeller is balanced across the rotational axis.

A blade according to the present disclosure has an airfoil section. The airfoil section has a radially inward end and a radially outward end. The airfoil section is narrowest at the radially inward end and at the radially outward end with a thicker section therebetween. The airfoil section may have a variety of geometries. In some embodiments, the airfoil section has a geometry that is described by the National Advisory Committee for Aeronautics (NACA) standards. In at least one example, the airfoil section has a NACA 4405 geometry.

The first digit of the NACA standard describes the maximum camber in percentage of the two-dimensional airfoil chord (e.g., the radial length of the airfoil section). The second digit of the NACA standard describes the approximate location of the maximum camber point along the chord line in $10^{th}$s of the chord line. The third and fourth digits, collectively, of the NACA standard describe the maximum thickness of the airfoil. Therefore, a 4405 geometry airfoil section has a maximum camber of 4% of the radial length of the airfoil section, and the maximum camber is located at 40% of the radial length of the airfoil section. The airfoil section has a maximum thickness in the direction of rotation that is 05% of the radial length of the airfoil section. In some embodiments, the airfoil has a geometry as thin as 4402 or as thick as 8610. Other examples of suitable airfoil geometries include 2204, 4412, and 6610. In some embodiments, the first digit of the NACA geometry is between 2 and 6. In some embodiments, the second digit of the NACA geometry is between 2 and 5. In some embodiments, the third and fourth digits, collectively, are between 04 and 12.

A favorable pressure gradient is desirable along the upper surface to about 40-45 percent chord. The radially inward end is a region having a shallow, adverse pressure gradient (transition ramp) that promotes efficient transition from laminar to turbulent flow. The curved transition ramp over the top of the airfoil (relative to the direction of airflow radially outward) is followed by a nearly linear pressure moment and stall characteristics. A steep, adverse pressure gradient at about 90-percent chord is a 'separation ramp', which confines turbulent separation to a small region near the trailing edge at the radially outward end. In some embodiments, by replacing the trailing edge with a forward raked exit section, the static pressure is recovered and embodiments of blades according to the present disclosure are able to achieve high flow rates, high static pressure, and higher acoustic performance.

In some embodiments, the airfoil section is the entire length of the blade. In some embodiments, the airfoil section is a percentage of the length of the blade in a range having an upper value, a lower value, or upper and lower values including any of 50%, 60%, 70%, 80%, 90%, 100%, or any values therebetween. In some embodiments, the airfoil section may be greater than 50% of the length of the blade. In some embodiments, the airfoil section may be less than 100% of the length of the blade. In some embodiments, the airfoil section is between 50% and 100% of the length of the blade. In some embodiments, the airfoil section is between 60% and 90% of the length of the blade. In at least one embodiment, the airfoil section is approximately 75% of the length of the blade.

In some embodiments, the airfoil section has a backward rake relative to the rotational direction and the radial direction. In some embodiments, the airfoil section has a rake in a range having an upper value, a lower value, or upper and lower values including any of −5°, −10°, −15°, −20°, −25°, −30°, or any values therebetween. In some examples, the airfoil rake is more negative than −5°. In some examples, the airfoil rake is more positive than −30°. In some examples, the airfoil rake is between −5° and −30°. In at least one example, the airfoil rake is approximately −20°.

The airfoil section may have the geometry of an airfoil in axial cross-section with a leading surface and trailing surface (relative to the direction of rotation) being parallel to the axial direction. In some embodiments, one or both of the leading surface and the trailing surface is oriented with a tilt relative to the axial direction. The tilt angle of one or both of the leading surface and the trailing surface may be in a range having an upper value, a lower value, or upper and lower values including any of −15°, −10°, −5°, 0°, 5°, 10°, 15°, or any values therebetween. In some embodiments, the tilt angle may be greater than −15°. In some embodiments, the tilt angle is less than 15°. In some embodiments, the tilt angle is between −15° and 15°. In at least one embodiment, the tilt angle is between −5° and 5°. In at least another embodiment, the tilt angle is 0°.

The remaining section of the blade may have a constant thickness in the direction of rotation. In some embodiments, an exit section of the blade is positioned radially outward from the airfoil section. The exit section may be bent or curved to alter the exit angle of outlet air. The exit section may have a forward rake, no rake (radially oriented), or backward rake. In some embodiments, the exit section has an exit angle relative to the radial direction and in the direction of rotation in a range having an upper value, a lower value, or upper and lower values including any of 0°, 5°, 10°, 15°, 20°, 25°, 30°, 35°, 40°, 45°, or any values therebetween. In some embodiments, the exit angle may be greater than 0°. In some embodiments, the exit angle is less than 45°. In some embodiments, the exit angle is between 15° and 40°. In at least one embodiment, the exit angle is approximately 35°.

In some embodiments, the support ring is connected to a top edge of the blades. In some embodiments, the support ring is connected to a bottom edge of the blades. The support ring may provide a bearing surface on which the impeller may rotate relative to a housing of the centrifugal blower. The support ring may provide support to the blades to prevent harmonic oscillations of the blades during operation.

The support ring may also maintain a predetermined pitch between the blades. The pitch is constant between all of the blades, in some embodiments, while in other embodiments, the pitch varies between blades. Varying the pitch may help reduce harmonics and/or acoustics of the rotation of the blades, which can reduce the noise associated with operation and reduce vibrations on the impeller to increase the operational lifetime of the device.

In some embodiments, the support ring is positioned at the radially outermost position of the blades, while in other embodiments, the support ring is positioned at an intermediate point between the two ends of the blade. In at least one embodiment, the support ring contacts and supports the blade at the transition point between the airfoil section and the exit section. The impeller may include a plurality of support rings, such as a first support ring at the radially outermost position of the blades and a second support ring at an intermediate point between the two ends of the blades.

The airflow into and through the impeller can be further improved by pairing an impeller according to the present disclosure with a housing including a volute having an increasing volute cross-sectional area. In some embodiments, at least one volute of the housing includes an expanding radius in the rotational direction of the impeller. The radius of the volute relative to the rotational axis of the impeller increases in the direction of rotation of the impeller to provide volume for the outlet air without creating additional backpressure that would impede airflow through the impeller. In some embodiments, the volute radius has linear rate of increase in the rotational direction of the impeller. In some embodiments, the volute radius changes non-linearly in the rotational direction of the impeller. In at least one embodiment, the volute radius changes non-linearly and the volute cross-sectional area changes linearly in the rotational direction of the impeller.

In some embodiments, the volute radius is defined by $$R_v = R_i \left[ 1 + s\left(\frac{\theta}{\pi}\right) \right]$$

where the volute radius ($R_v$) is related to the impeller radius ($R_i$) and the angular position ($\theta$) around the rotational axis in radian relative to $\pi$. The linear relationship is based on a slope value (s). In some embodiments, the slope value is in a range having an upper value, a lower value, or upper and lower values including any of 0.20, 0.25, 0.30, 0.35, 0.40, 0.45, 0.50, or any values therebetween. In some embodiments, the slope value is greater than 0.20. In some embodiments, the slope value is less than 0.50. In some embodiments, the slope value is between 0.2 and 0.5. In some embodiments, the slope value is between 0.3 and 0.4. In at least one embodiment, the slope value is approximately 0.33.

The volute is positioned around a portion of the circumference of the impeller. The volute length is the linear length of the portion of the volute adjacent to the impeller. In some embodiments, the volute length around the circumference is a percentage of the circumference in a range having an upper value, a lower value, or upper and lower values including 33.3%, 35%, 40%, 45%, 50%, 55%, 60%, 65%, 66.6%, or any values therebetween. In some embodiments, the volute length is greater than ⅓ of the impeller circumference. In some embodiments, the volute length is less than ⅔ of the impeller circumference. In some embodiments, the volute length is between ⅓ and ⅔ of the impeller circumference. In some embodiments, the volute length is between 40% and 60% of the impeller circumference. In at least one embodiment, the volute length is approximately 50% of the impeller circumference.

In some embodiments, the volute radius rate of increase is linear to an exit of the volute into a vent or other conduit to move the outlet air away from the impeller. The exit may have a volute exit angle. In some embodiments, the volute exit angle is in a range having an upper value, a lower value, or upper and lower values including any of 5°, 6°, 7°, 8°, 9°, 10°, or any values therebetween. In some embodiments, the volute exit angle is greater than 5°. In some embodiments, the volute exit angle is less than 10°. In some embodiments, the volute exit angle is between 5° and 10°. In some embodiments, the volute exit angle is between 7° and 9°. In at least one embodiment, the volute exit angle is approximately 8°.

A centrifugal blower according to the present disclosure can direct air for thermal management of an electronic device. The centrifugal blower can exhaust hot air away from electronic components or can move cool air toward electronic components. In some embodiments, a heat exchanger is positioned in a volute or in the housing of the centrifugal blower such that outlet air is directed over and/or through the heat exchanger. The heat exchanger may receive heat from electronic components, and the outlet air may cool the portion of the heat exchanger in the centrifugal blower such that a thermal gradient of the heat exchanger continues to draw heat from the electronic components.

To facilitate operating the centrifugal blower at higher rotational speeds and/or at lower operating noise levels, in some embodiments, one or more surfaces of the impeller include boundary layer features to separate a boundary layer and improve acoustic properties of the blades and impeller. In some embodiments, a radially inward tip of the blade includes serrations, dimples, recesses, or protrusions that disrupt the boundary layer and/or produce microvortices to reduce harmonic effects on the impeller. In some embodiments, the boundary layer features are positioned on each blade of the plurality of blades. In some embodiments, the boundary layer features are positioned on some of the blades but not all of the blades. In some embodiments, the boundary layer features are positioned on the hub or support ring of the impeller.

In some embodiments, a centrifugal blower according to the present disclosure provides improved airflow and/or acoustic performance to more efficiency provide thermal management to an electronic device.

The present disclosure relates to systems and methods for improving airflow through a centrifugal blower according to at least the examples provided in the sections below:

1. An impeller for a centrifugal blower, the impeller comprising:
   at least one blade oriented in a radial direction of the impeller, the blade including an airfoil section with a radially inward end and a radially outward end that are thinner than at least one point between the radially inward end and the radially outward end.
2. The impeller of section 1, wherein the airfoil is raked in backward direction relative to a rotational direction of the impeller.
3. The impeller of section 2, wherein the rake of at least a portion of the airfoil section is between −15° and −30°.

4. The impeller of any preceding section, wherein the airfoil section has National Advisory Committee for Aeronautics (NACA) 4405 geometry.
5. The impeller of any preceding section, wherein the blade is continuous between a hub and a support ring radially outward from the hub.
6. The impeller of section 5, wherein the support ring is connected to and supports the radially outward end of the airfoil section.
7. The impeller of any preceding section, wherein the impeller comprises a plurality of blades with a varying pitch between blades of the plurality of blades.
8. The impeller of any preceding section, wherein the airfoil section is curved in backward direction relative to a rotational direction of the impeller.
9. The impeller of any preceding section, wherein at least a portion of the airfoil section has a tilt in the direction of rotation.
10. An impeller for a centrifugal blower, the impeller comprising:
    a hub configured to connect to an axle at a rotational axis; and
    at least one blade connected to the hub and oriented in a radial direction of the impeller relative to the rotational axis, the blade including:
        an airfoil section with a radially inward end and a radially outward end that are thinner than at least one point between the radially inward end and the radially outward end, the airfoil section having a negative rake relative to a direction of rotation of the impeller, and
        an exit section with a more positive rake than the airfoil section.
11. The impeller of section 10, wherein the exit section has an exit angle greater than 15°.
12. The impeller of section 10 or 11, wherein the exit section is curved.
13. The impeller of any of sections 10-12, wherein an exit angle of the exit section is 0°.
14. The impeller of any of sections 10-13, further comprising a support ring connected to and supporting the blade at a transition point between the airfoil section and the exit section.
15. The impeller of any of sections 10-14, wherein the exit section has a constant thickness.
16. A centrifugal blower for use in an electronic device, the centrifugal blower comprising:
an impeller configured to rotate around a rotational axis in a rotational direction; and
a housing including at least one volute, the volute including:
    an outer wall positioned at a volute radius that increases in the rotational direction of the impeller.
17. The centrifugal blower of section 16, wherein the volute radius increases linearly relative to an angle around the rotational axis.
18. The centrifugal blower of section 16 or 17, wherein the volute is located around between ⅓ and ⅔ of a circumference of the impeller.
19. The centrifugal blower of any of sections 16-18, wherein the volute radius is defined by $$R_v = R_i \left[1 + s\left(\frac{\theta}{\pi}\right)\right]$$

wherein s is a slope value between 0.2 and 0.5.

20. The centrifugal blower of any of sections 16-19, wherein a volute exit angle is between 5° and 10°.
21. Any device, system, or method described or depicted herein.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the scope of the present disclosure, and that various changes, substitutions, and alterations may be made to embodiments disclosed herein without departing from the scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:
1. An impeller for a centrifugal blower, the impeller comprising:
    at least one blade oriented in a radial direction of the impeller, the blade including an airfoil section with both a radially inward end and a radially outward end that are thinner than at least one point between the radially inward end and the radially outward end, wherein the impeller comprises a plurality of blades with a varying pitch between blades of the plurality of blades.

2. The impeller of claim 1, wherein the airfoil is raked in backward direction relative to a rotational direction of the impeller.

3. The impeller of claim 2, wherein the rake of at least a portion of the airfoil section is between −15° and −30°.

4. The impeller of claim 1, wherein the airfoil section has National Advisory Committee for Aeronautics (NACA) 4405 geometry.

5. The impeller of claim 1, wherein the blade is continuous between a hub and a support ring radially outward from the hub.

6. The impeller of claim 5, wherein the support ring is connected to and supports the radially outward end of the airfoil section.

7. The impeller of claim 1, wherein the airfoil section is curved in backward direction relative to a rotational direction of the impeller.

8. The impeller of claim 1, wherein at least a portion of the airfoil section has a tilt in the direction of rotation.

9. An impeller for a centrifugal blower, the impeller comprising:
   a hub configured to connect to an axle at a rotational axis; and
   at least one blade connected to the hub and oriented in a radial direction of the impeller relative to the rotational axis, the blade including:
      an airfoil section with a radially inward end and a radially outward end that are both thinner than at least one point between the radially inward end and the radially outward end, the airfoil section having a negative rake relative to a direction of rotation of the impeller, and
      an exit section with a more positive rake than the airfoil section.

10. The impeller of claim 9, wherein the impeller comprises a plurality of blades with a varying pitch between blades of the plurality of blades.

11. The impeller of claim 10, wherein the exit section has an exit angle greater than 15°.

12. The impeller of claim 10, wherein the exit section is curved.

13. The impeller of claim 10, wherein an exit angle of the exit section is 0°.

14. The impeller of claim 10, further comprising a support ring connected to and supporting the blade at a transition point between the airfoil section and the exit section.

15. The impeller of claim 10, wherein the exit section has a constant thickness.

16. A centrifugal blower for use in an electronic device, the centrifugal blower comprising:
   the impeller of claim 10; and
   a housing including at least one volute, the volute including:
      an outer wall positioned at a volute radius that increases in the rotational direction of the impeller.

17. The centrifugal blower of claim 16, wherein the volute radius increases linearly relative to an angle around the rotational axis.

18. The centrifugal blower of claim 16, wherein the volute is located around between ⅓ and ⅔ of a circumference of the impeller.

19. The centrifugal blower of claim 16, wherein the volute radius is defined by $$R_v = R_i \left[ 1 + s\left(\frac{\theta}{\pi}\right) \right]$$

wherein s is a slope value between 0.2 and 0.5.

20. The centrifugal blower of claim 16, wherein a volute exit angle is between 5° and 10°.

* * * * *